Oct. 25, 1966  J. B. NASWORTHY  3,280,435
SYSTEMS FOR LINKING THE ENDS OF MATERIAL
Original Filed Dec. 14, 1961  2 Sheets-Sheet 1

INVENTOR.
JOHN B NASWORTHY
BY
Baldwin & Martin
ATTORNEYS

Oct. 25, 1966            J. B. NASWORTHY            3,280,435
SYSTEMS FOR LINKING THE ENDS OF MATERIAL
Original Filed Dec. 14, 1961            2 Sheets-Sheet 2
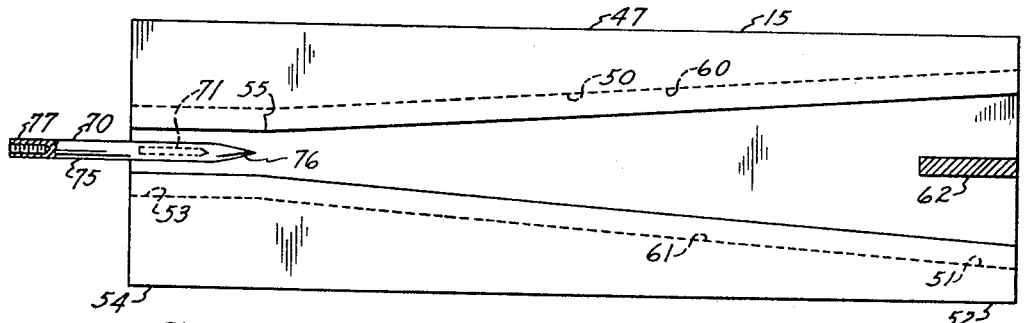
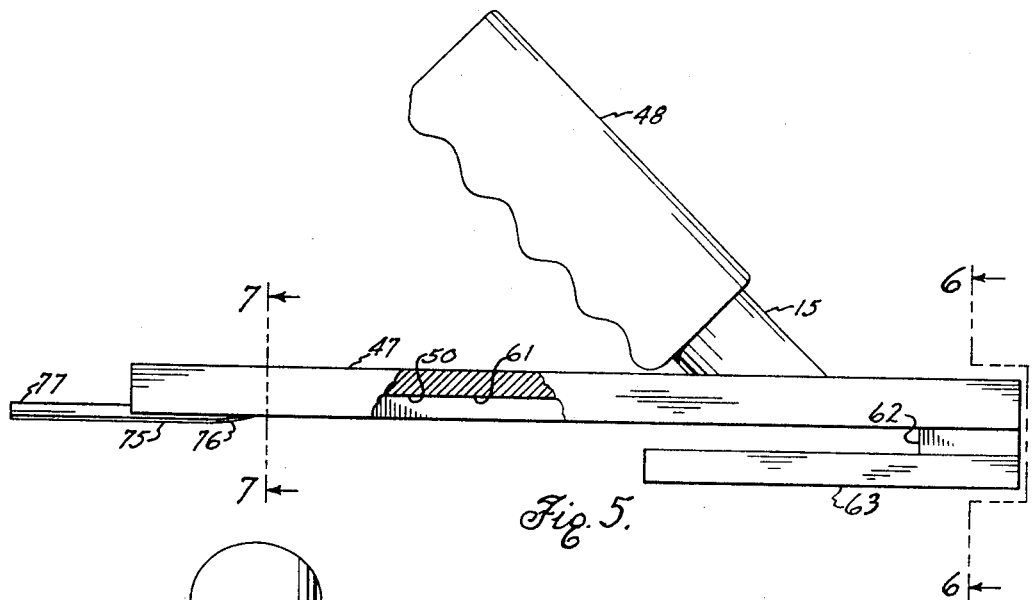
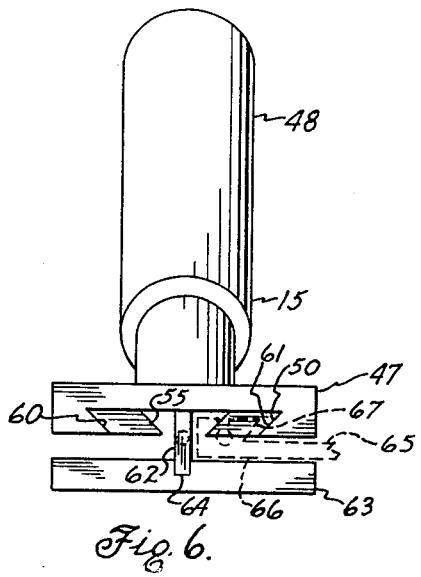
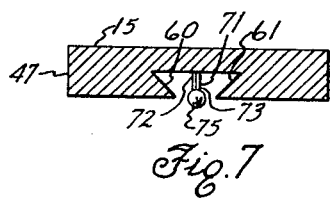
INVENTOR.
JOHN B. NASWORTHY
BY
Baldwin & Martin
ATTORNEYS

United States Patent Office 3,280,435
Patented Oct. 25, 1966

3,280,435
SYSTEMS FOR LINKING THE ENDS
OF MATERIAL
John B. Nasworthy, Savannah, Ga., assignor to Nasworthy Fasteners, Inc., Savannah, Ga., a corporation of Georgia
Continuation of application Ser. No. 159,376, Dec. 14, 1961. This application July 21, 1965, Ser. No. 477,348
14 Claims. (Cl. 24—33)

This application is a continuation of my application Serial No. 159,376, filed December 14, 1961, entitled Systems for Linking the Ends of Material, now abandoned.

This invention relates to a system for linking the ends of material and more particularly refers to a tool and method for joining the ends of drier felts to make the felts continuous.

The general object of this invention is to provide an improved tool and method for linking the ends of material.

A specific object of this invention is to provide a fastening tool and method which reduce the time required in joining the ends of sheet material.

Another specific object of this invention is the provision of a durable joint linking sheet material end portions accurately and securely.

A particular object of this invention is the provision of improved fastening elements for attachment to the ends of sheet material or drier felt.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIGURE 4 is a bottom plan view of the tool of FIGURE 1 partially in section;

FIGURE 5 is a side elevational view of the tool of FIGURES 1 and 4, partially broken away;

FIGURE 6 is a front elevational view of the tool taken along line 6—6 of FIGURE 5, including a fastening element in broken lines; and FIGURE 7 is a sectional view of the tool taken along line 7—7 of FIGURE 5.

Figure 1:
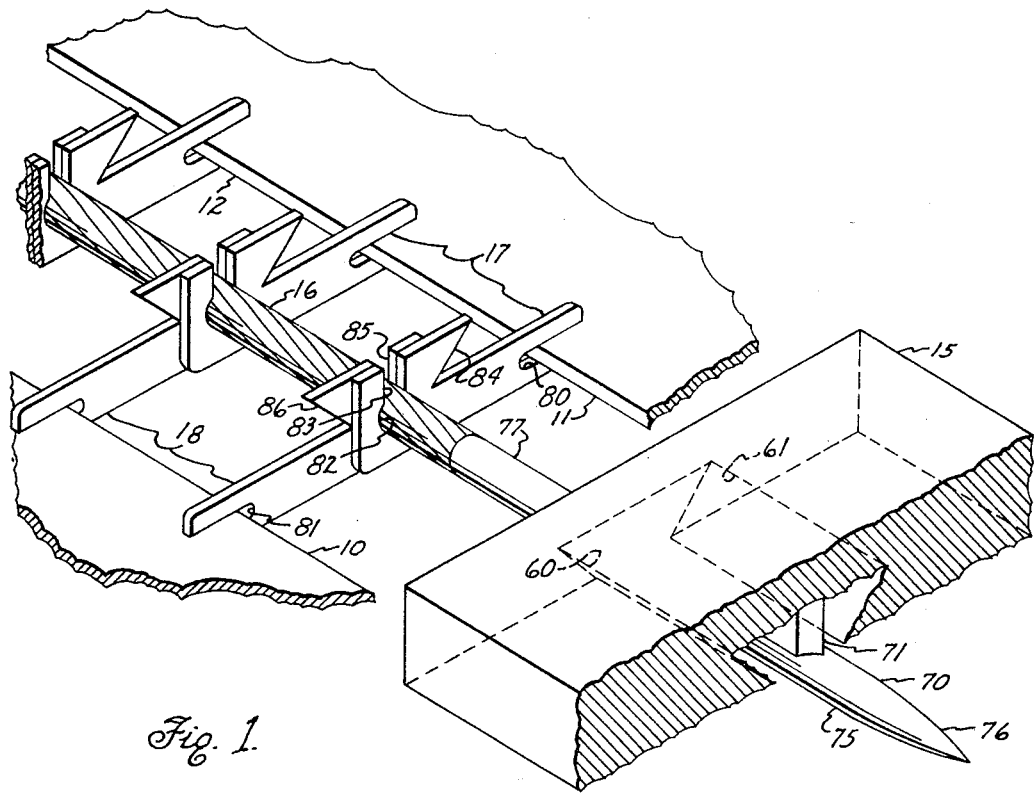
FIGURE 1 is a fragmentary perspective view on an enlarged scale of a joint linking the fastening elements attached to the sheet material end portions by sliding a tool therealong which passes a linking cable through the elements, the tool being more clearly shown in FIGURES 4, 5, 6 and 7.

Referring more particularly to the drawings, FIGURE 1 illustrates the end portions 10 and 11 of sheet material or drier felt 12 being linked together by the sliding tool 15 drawing a linking cable 16 through the corresponding overlapped and aligned fastening elements 17 and 18 attached to respective end portions 11 and 10 of felt 12.

Figure 3:
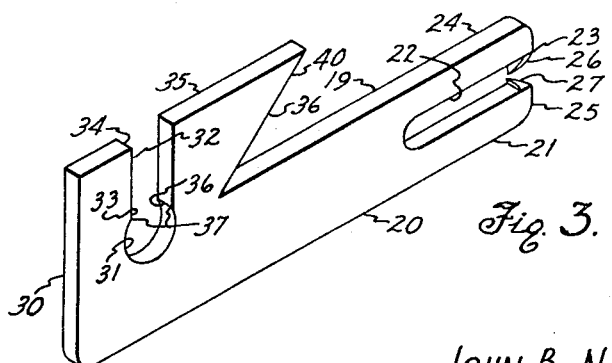
FIGURE 3 is a perspective exploded view of the improved fastening element shown in FIGURE 1.

The fastening elements 17 and 18, in accordance with this invention, are shown to be substantially the same and the description of element 19 in FIGURE 3 will be understood to refer to each of the fastening elements 17 and 18 of FIGURE 1. Fastening element 19 comprises an elongated body member 20 having means, generally designated 23, at one end portion 21 thereof for attachment to one of the sheet material end portions 10 and 11 of FIGURE 1. The means 23 for attachment is specifically shown as including a slot or material receiving passageway 22 interrupting end portion 21 of body member 20. Body member 20 further includes spaced arms 24 and 25 defining respective sides of passageway 22, and respective tabs in the form of barbs 26 and 27 are connected to arms 24 and 25 and extend into passageway 22. For example, when sheet material 12 is disposed within passageway 22 and the arms 24 and 25 are forcibly moved toward each other, arms 24 and 25 compress the material while barbs 26 and 27 penetrate the material for securely attaching fastening element 19 thereto.

The other end portion 30 of body member 20 comprises a cable receiving passageway 31 extending therethrough and an access passageway 32 interrupting body member 20 and opening inwardly at one end 33 into the cable receiving passageway 31 and opening outwardly of body member 20 at its other end 34. Passageway 32 constitutes a slot extending between edge 35 of body member 20 and passageway 31. Slot or passageway 32 permits a portion of tool 15 to pass therethrough, as the tool 15 is being moved along the fastening elements 17 and 18.

Body member 20 includes caging means designated 36 between the cable receiving passageway 31 and access passageway 32 for blocking the access passageway end 33. The caging means, as shown in FIGURE 3, includes a pair of shoulders 37 extending from body member 20 into and between passageways 31 and 32. These shoulders 37 prevent the cable 16 from lateral movement through access passageway 32 when cable 16 is drawn through passageway 31 by tool 15, as will be more specifically described hereinafter.

The fastening element 19 has a wing portion 40 adjacent end portion 30 of body member 20 adapted and arranged to be fittingly disposed within a complementary guideway 50 of the tool 15 as clearly shown in FIGURE 6. Wing portion 40 is specifically shown as being wedge shaped and formed by the intersecting edges 35 and 36 of body member 20, it being understood that other shapes for the wing portion 40 could be used in accordance with the present invention without departure therefrom.

Figure 2:
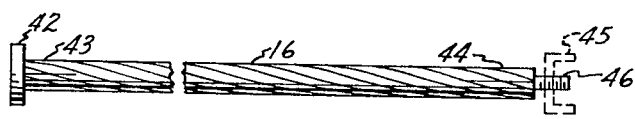
FIGURE 2 is an elevational view of the cable shown in FIGURE 1.

The elongated cable 16 is shown in FIGURE 2 and includes retaining means connected thereto for maintaining cable 16 from being displaced in a longitudinal direction after cable 16 has been drawn through the overlapped fastening elements 17 and 18 of FIGURE 1. The retaining means comprises a stop element 42 attached to the trailing end 43 of cable 16 and a removable pin 45 which extends through the leading end 44 thereof. The leading end 44 of cable 16 is externally threaded for releasably attaching the cable 16 to tool 15, as described hereinbelow.

Tool 15, in accordance with the present invention, comprises an elongated base member 47, a handle 48 attached to and extending laterally from base member 47, and an elongated guideway 50 within base member 47. Guideway 50 has an entrance 51 at the forward end 52 of base member 47 and an exit 53 at the rearward end 54 thereof. Guideway 50 tapers between entrance 51 and a point 55 adjacently spaced from exit 53. Between point 55 and exit 53 guideway 50 is substantially straight and need not be tapered for reasons which will be apparent from the further description of tool 15.

Guideway 50 comprises a pair of wedge shaped grooves 60 and 61 which are complementary with wedge shaped wing portion 40 of fastening element 19. Between grooves 60 and 61 a support 62 is connected to base member 47 adjacent the forward end 52 and extends into guideway 50. A platform 63 is mounted on the outer extremity 64 of support 62, platform 63 being substantially parallel to base member 47. As shown in FIGURE 6, the fastening element 65, shown by broken lines, enters the guideway 50 at the entrance 51 thereof with the element 65 having its bottom edge 66 supported by platform 63 and/or its wing portion 67 fittingly disposed within groove 60 of guideway 50. Platform 63 extends from the forward portion 52 of body member 47 to a point rearwardly spaced therefrom. The fastening elements are prevented from falling from the tool 15 after entering tool 15 at the forward end 52 by the platform 63 and/or the grooves 60 and 61 of the guideway 50, whereas the fastening elements are prevented from falling from tool 15 adjacent the rearward end portion 54 by having the wing portions fittingly disposed within grooves 60 and 61.

Tool 15 further includes holding means generally designated at 70 connected to base member 47 adjacent the rearward portion 54 thereof for releasably connecting cable 16 thereto. The holding means 70 specifically comprises a support 71 having one end 72 connected to base member 47 and extending laterally into guideway 50 adjacent the exit 53. End 73 of support 71 mounts an elongated rod in the form of a needle 75 generally parallel with the elongated guideway 50, needle 75 having a pointed leading end 76 adjacent point 55 which approximately designates the termination of the taper for guideway 50. The trailing end 77 of needle 75 is threaded internally to detachably receive therein the complementary external threads 46 on leading end 44 of cable 16.

The system and method of joining the end portions 10 and 11 of the drier felt 12 will be more clearly understood by referring to FIGURE 1. The fastening elements 17 and 18 are attached to respective spaced apart end portions 11 and 10 of felt 12. The fastening elements 17 include material receiving passageways 80 and the fastening elements 18 have similar passageways 81, passageways 80 and 81 being identical to passageway 22 of element 18. The elements 17 further include cable receiving passageways 82, access passageways 83 and wing portions 84, respectively identical to passageway 31, passageway 32 and wing portion 40 of element 19. Elements 18 similarly have cable receiving passageways (not shown), access passageways 85 and wing portions 86.

A cable 16 is attached to tool 15 by threading the leading end 44 of the cable 16 into the trailing end portion 77 of needle 75. Handle 48 is grasped by hand and the fastening elements 17 and 18 adjacent one side (not shown) of the sheet material 12 are passed into the tool 15 at its forward end 52. These elements 17 and 18 have their wing portions 84 disposed in a groove 61 and wing portions 85 disposed in groove 60. As the tool 15 slides along the opposing fastening elements 17 and 18, the fastening elements within guideway 50 progress from the entrance 51 to a point 55 adjacent the leading end 76 of needle 75. As these opposing elements progress through the tapered guideway 50, such elements are drawn together into an overlapped relation such that the corresponding opposing elements have their respective access passageways as well as their respective cable receiving passageways in registering alignment with respect to each other. As tool 15 is further moved along the fastening elements, the overlapped fastening elements progress from point 55 toward exit 53 of guideway 50. The needle 75 is drawn through the aligned cable receiving passageways and the support 71 passes through the aligned access passageways of the overlapped elements before such elements are expelled from exit 53 of passageway 50. Upon further movement of tool 15 the cable 16 is drawn through the aligned cable receiving passageways of the overlapped fastening elements after such elements leave guideway exit 53. After the cable 16 is passed through all of the cable receiving passageways of all the elements 17 and 18 attached to respective end portions 11 and 10 of sheet material 12, the tool 15 is detached from the cable 16 and a pin 45 is inserted through cable 16 to substantially prevent disengaging movement of the cable 16 from the cable receiving passageways along the cable's longitudinal axis.

It is to be noted that the caging shoulders, identical to shoulders 37 of element 19, of the fastening elements 17 and 18 substantially prevent any disengaging lateral movement of the cable 16 from the cable receiving passageways through the access passageways thereof.

It will be apparent from the specific descriptions below of a typical fastening element cable and tool, that the cable receiving passageways are of a predetermined diameter and the cable diameter is slightly smaller than the diameters of the cable receiving passageways. The width of the slots or access passageways is slightly smaller than the diameter of the cable whereby the cable is prevented from movement laterally from the cable receiving passageways through the access passageways.

A typical fastening element in accordance with the invention comprises a metal body having a length of approximately one inch with the tip of the wing portion being disposed midway between its ends and the slanted edge of the wing portion is at forty-five degrees with respect to the horizontal. The cable receiving passageway is five-thirtysecond inch in diameter and the width of the access passageway or slot is three-thirtysecond inch.

A sliding tool used to link the fastening elements attached along each end portion of the sheet material comprises a metal base member having a length of eight inches, the guideway extending through the base member being about one and one-half inches at the forward end and tapering down to eleven-sixteenth inch at the rearward end. The grooves forming the guideway are approximately complementary with the wing portions of the fastening elements to receive the wing portions therein. The width of the needle support is about one-sixteenth inch and the needle diameter is about one-eighth inch.

The cable has a diameter of one-eighth inch and the stop is approximately three-sixteenth inch in diameter.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. The system of linking the spaced apart end portions of sheet material comprising elongated fastening elements atached along one said end portion, corresponding elongated fastening elements operatively disposed and attached at one of their ends along the other said end portion, each said element and said corresponding element including an elongated body having opposite ends, each said body having a cable receiving passageway extending therethrough adjacent one of its said ends, the other of said body ends being adapted for attachment to respective said sheet material end portions, an access passageway interrupting said body adjacent its said one end and opening inwardly at one end into said cable receiving passageway and opening outwardly of said body at its other end, said body further including a wedge-shaped guideable wing portion spacedly between said body ends, an elongated cable for solely linking said elements and said corresponding elements, a cable drawing tool for linking said elements and said corresponding elements, said tool comprising a base member having an entrance portion and an exit portion, a guideway through said base member tapering between said entrance portion and said exit portion thereof, holding means connected to said base member and extending into said guideway adjacent said exit portion for detachably connecting said cable thereto, said tool slidably engaging said elements and said corresponding elements with said wing portion of each said element and corresponding element entering said guideway at said entrance portion and overlapping said elements and said corresponding elements as they are progressing through said guideway from said entrance portion toward said exit portion, said cable receiving passageway and said access passageway of each said overlapped element and said corresponding element being respectively in registering alignment, said tool holding means being passed through said aligned access passageways and said holding means and said cable being passed through said aligned cable receiving passageways whereby said overlapped elements are linked solely by said cable.

2. The system of linking the spaced apart end portions of sheet material comprising elements attached along one said end portion, corresponding elements operatively disposed and attached along the other said end portion, each said element and said corresponding element including an elongated body having a cable receiving passageway therethrough adjacent one of its ends, the other of said body ends being adapted for attachment to respective said sheet material end portions, an access passageway interrupting said body and opening inwardly at one end into said cable receiving passageway and opening outwardly of said body at its other end, said body further including a guidable wing portion spacedly between said body ends, means for linking said elements and said corresponding elements, said means including an elongated base member and a guideway through said base member tapering between the ends thereof, said means further including an elongated cable for providing the sole connection between said elements and holding means extending into said guideway adjacent the tapered end portion for detachably connecting said cable thereto, said means slidably engaging said elements and said corresponding elements with said wing portion of each said element and corresponding element entering said guideway at the end portion opposite said tapered end portion and overlapping said elements and said corresponding elements as they are progressing through said guideway from said opposite end portion toward said tapered end portion, said cable receiving passageway and said access passageway of each said overlapped element and said corresponding element being respectively in registering alignment, said means having its said holding means passed through said aligned access passageways and said holding means and said cable passed through said aligned cable receiving passageways whereby said overlapped elements are linked.

3. A joint linking two sheet material end portions, said material end portions being spaced apart a predetermined distance, a plurality of elongated elements attached to each of said material end portions and extending therefrom into the space therebetween, an elongated cable, each of said elements including an elongated body having attaching means at one end portion thereof for connection to said material end portions, the other end portion of said body including a cable receiving passageway therethrough, said body at said other end portion having an edge and a slot in said edge communicating at its inner end with said passageway, the elements on each of said material end portions overlapping at their other end portions the elements on the other of said material end portions and cooperating therewith to provide a plurality of sets of overlapping fastening element end portions spaced apart in a direction axially of the cable receiving passageways, said cable passing through said passageway of each of said elements, each of said fastening elements having guide means between said body end portions engageable by a tool for moving said fastening elements on one material end portion toward said fastening elements on the other material end portion, and retaining means attached to the respective end portions of said cable to maintain said cable within said passageway of each said element from movement therethrough, each said body further including caging means to maintain said cable within each said passageway from movement through said slot.

4. A joint linking two spaced apart ends of a drier felt comprising a plurality of fastening elements attached to each of the ends of said drier felt, each fastening element including an elongated body extending into the space between said ends of the drier felt, each fastening element body being attached to one of said ends of the drier felt and extending generally parallel to and in overlapping relation to a fastening element body respectively associated with the other end of the drier felt, and means connecting the fastening elements associated with one end of the drier felt to the fastening elements associated with the other end of the drier felt consisting of an elongated cable and means providing openings in the overlapping fastening element bodies receiving said cable, each of said bodies being provided with an access opening extending inwardly at right angles to the axis of the cable receiving opening in the body and having a width less than the diameter of said cable thereby preventing the cable from laterally passing therethrough, guide means on each of said fastening elements adjacent said cable receiving opening engageable by a tool to move said fastening elements connected to one drier felt end toward said fastening elements connected to the other drier felt end, and releasable means connected to said cable and preventing inadvertent withdrawal of the cable from the cable receiving openings in the fastening element bodies.

5. A joint linking two sheet material end portions spaced apart a predetermined distance comprising a plurality of elongated fastening elements attached at one end to each of said end portions and extending therefrom into the space between said end portions, each fastening element associated with one of said end portions being disposed in overlapping relation to a next adjacent fastening element on the other of said end portions, each of said fastening elements having guide means between their respective ends engageable by a tool to move said fastening elements on one end portion toward said fastening elements on the other end portion, an elongated cable, the overlapping fastening elements being provided with openings receiving said cable, each fastening element having an edge and a slot in said edge communicating at its inner end with the cable receiving opening in the element, the oppositely facing overlapping portions of each next adjacent pair of overlapping fastening elements being smooth and free of any interlocking irregularities, each fastening element further including means for blocking said inner end of said slot therein whereby said cable is prevented from lateral movement therethrough, and means attached to the respective end portions of said cable to maintain said cable within said cable receiving openings in the fastening elements thereby preventing inadvertent longitudinal withdrawal of the cable from said cable receiving openings.

6. A fastening element comprising an elongated planar body member having means at one end thereof for attaching said element to sheet material, a cable receiving passageway extending through said body member between the planar surfaces thereof at its other end, said body having an edge and a slot extending from said edge adjacent said other end of the body member into communication with said cable receiving passageway, said slot having a width substantially less than the diameter of said cable receiving passageway thereby to prevent a cable received in said passageway from movement through said slot, said body member having a second edge disposed intermediate said cable receiving passageway and said one end of the body member and inclined inwardly of said body member from said first edge toward said cable receiving passageway thereby providing a cam surface adapted and arranged to be engaged by a complemental surface of a guideway of a tool.

7. The system for linking the spaced apart end portions of sheet material comprising elements attached along one said end portion spaced each from the next, corresponding elements operatively disposed and attached along the other said end portion spaced each from the next, each said element and said corresponding element including an elongated body having a cable receiving passageway adjacent one of its ends, the other of said body ends being adapted for attachment to respective said sheet material end portions, an access passageway interrupting said body and opening inwardly at one end into said cable receiving passageway and opening outwardly of said body at its other end, said body further including guide means between said body ends, mechanical means for linking said elements and said corresponding elements, said mechanical means including an elongated base member and a guideway through said base member tapering between the ends thereof, said mechanical means further including an elongated cable for providing the sole connection between said elements and holding means extending into said guideway adjacent the tapered end portion for detachably connecting said cable thereto, said mechanical means slidably engaging said elements and said corresponding elements with said guide means of each said element and corresponding element entering said guideway at the end portion opposite said tapered end portion and moving said elements and said corresponding elements toward each other as they are progressing through said guideway from said opposite end portion toward said tapered end portion, said elements and said corresponding elements being overlapped by said mechanical means with their said cable receiving passageways and said access passageways respectively in registering alignment, said mechanical means having its said holding means passed through said aligned access passageways and said holding means and said cable passed through said aligned cable receiving passageways whereby said overlapped elements are linked solely by said cable.

8. The system of linking the spaced apart end portions of sheet material comprising elements attached along one said end portion, corresponding elements operatively disposed and attached along the other said end portion, each said element and said corresponding element including an elongated body having a cable receiving passageway therethrough adjacent one of its ends, the other of said body ends being attached to respective said sheet material end portions, an access passageway interrupting said body and opening inwardly at one end into said cable receiving passageway and opening outwardly of said body at its other end, said body further including a guidable camming surface portion between said body ends, means for linking said elements and said corresponding elements, said means including an elongated tapering guideway for engaging said camming surface portion, said means further including an elongated cable for providing the sole connection between said elements and holding means extending into said guideway adjacent the most tapered end portion thereof for detachably connecting said cable thereto, said means slidably engaging said elements and said corresponding elements with said camming surface portion of each said element and corresponding element entering said guideway at the end portion opposite said tapered end portion and overlapping said elements and said corresponding elements, said cable receiving passageway and said access passageway of each said overlapped element and said corresponding element being respectively in registering alignment, said means having its said holding means passed through said aligned access passageways and said holding means and said cable passed through said aligned cable receiving passageways whereby said overlapped elements are linked.

9. A joint linking two spaced apart end portions of sheet material comprising a plurality of fastening elements attached to each of said ends of said sheet material, each fastening element including an elongated body extending into the space between said ends of the sheet material, each fastening element body being attached to one of said ends of the sheet material and extending generally parallel to and in overlapping relation to a fastening element body respectively associated with the other end of the sheet material, and means connecting the fastening elements associated with said sheet material one end to the fastening elements associated with said sheet material, other end consisting of an elongated cable and openings within the bodies of the overlapping fastening elements for receiving said cable, each of said bodies being provided with an access opening extending inwardly of the cable receiving opening in said body and having a width less than the diameter of said cable thereby preventing the cable from laterally passing therethrough, camming means on each of said fastening element bodies between the ends thereof and adjacent said cable receiving opening engageable by a tool to move said fastening elements connected to one sheet material end toward said fastening elements connected to the other sheet material end, and releaseable means connected to said cable and preventing inadvertent withdrawal of the cable from the cable receiving openings.

10. A fastening element comprising an elongated planar body member having means at one end thereof for attaching said element to sheet material, a cable receiving passageway extending through said body member between the planar surfaces thereof at its other end, said planar surfaces being free of interlocking irregularities, said body having an edge and a slot extending from said edge adjacent said other end of the body member into communication with said cable receiving passageway, said slot having a width substantially less than the diameter of said cable receiving passageway thereby to prevent a cable receiving in said passageway from movement through said slot, said body member having a camming edge disposed intermediate said cable receiving passageway and said one end of the body member and extending inwardly of said body member from said first edge thereby providing a cam surface adapted and arranged to be engaged by a complemental surface of a guideway of a tool.

11. A fastening element comprising an elongated planar body member having one end thereof adapted to be attached to sheet material, said one end including a pair of spaced arms for the reception therebetween of an edge of the sheet material, each said arm having a barb extending into the space between said arms for secure connection with the sheet material, said body having an edge and a slot extending from said edge adjacent said other end of the body member into communication with said cable receiving passageway, said slot having a width substantially less than the diameter of said cable receiving passageway thereby to prevent a cable received in said passageway from movement through said slot, said body member having a second edge disposed intermediate said cable receiving passageway and said one end of the body member and extending inwardly of said body member from said first edge thereby providing a camming surface adapted and arranged to be engaged by a complemental surface of a guideway of a tool.

12. A fastening element comprising an elongated planar body member having one end portion for attaching said element to an edge of sheet material, said one end portion including a pair of arms spaced apart for the reception therebetween of the edge of a sheet material said one end portion having a shoulder between said arms for the abutment of the edge of sheet material, a cable receiving passageway extending through said body member between the planar surfaces thereof at its other end, said body having an edge and a slot extending from said edge adjacent said other end of the body member into communication with said cable receiving passageway, said slot having a width substantially less than the diameter of said cable receiving passageway thereby to prevent a cable received in said passageway from movement through said slot, said body member having a second edge disposed intermediate said cable receiving passageway and said shoulder between said arms of said body member and extending inwardly of said body member from said first edge thereby providing a cam surface adapted and arranged to be engaged by a complemental surface of a guideway of a tool.

13. A method of linking a plurality of fastening elements attached to one end portion of sheet material with a plurality of fastening elements attached to the other end portion thereof wherein each of the fastening elements includes a planar body member free from interlocking irregularities and having a cable receiving passageway and an access passageway interrupting the body member and communicating with its respective cable receiving passageway comprising moving a fastening element engaging tool along said body portion of each said fastening element to overlap said fastening elements on said one end portion with said fastening elements on said other end portion thereby aligning the cable receiving passageways of the overlapped fastening elements and aligning the access passageways thereof, advancing said tool along the overlapped fastening elements to pass a cable connecting support thereof through the aligned access passageways and to pass said support with the cable releasably connected thereto through said aligned cable receiving passageways and linking the overlapped fastening elements with only the cable interconnecting same, removing said cable passed through said overlapped fastening elements from said tool, and maintaining said cable from inadvertent withdrawal from said cable receiving passageways after removal from said tool.

14. A tool for linking the fastening elements on one end portion of sheet material with the corresponding fastening elements on the other end portion of sheet material wherein each fastening element includes a cable receiving passageway and an access passageway communicating therewith comprising a base member having an entrance portion and an exit portion, a handle attached to said base member, a guideway through said base member extending respectively between said entrance portion and said exit portion thereof, a rod, support means connected to said member for positioning said rod within said exit portion, releaseable connecting means for detachably joining the cabe to said rod, a platform supported by said base below said guideway adjacent said entrance portion and terminating at its rearward end forwardly of said rod, said tool being adapted and arranged to admit the fastening elements of the end portions of sheet material within said guideway at said entrance portion and to overlap the fastening elements with their cable receiving passageways and their access passageways in respective register and to pass said rod and the cable through the registered cable receiving passageways while said support means is passed through the registered access passageways, said tool linking the registered cable receiving passageways solely with the cable before said tool releases the overlapped fastening elements.

References Cited by the Examiner
UNITED STATES PATENTS

| | | |
|---|---|---|
| 1,108,748 | 8/1914 | Hampton. |
| 2,629,909 | 3/1953 | Hall _____ 24—33 |

FOREIGN PATENTS

| | | |
|---|---|---|
| 428,469 | 5/1935 | Great Britain. |
| 658,595 | 10/1951 | Great Britain. |

WILLIAM FELDMAN, *Primary Examiner.*

MILTON S. MEHR, *Examiner.*